G. V. CURTIS.
UNIVERSAL JOINT.
APPLICATION FILED JAN. 10, 1917.

1,267,852.

Patented May 28, 1918.

WITNESS
A. C. Fairbanks

INVENTOR.
George V. Curtis,
BY
Frank A. Cutter,
ATTORNEY.

UNITED STATES PATENT OFFICE.

GEORGE V. CURTIS, OF SPRINGFIELD, MASSACHUSETTS.

UNIVERSAL JOINT.

1,267,852.        Specification of Letters Patent.      Patented May 28, 1918.

Application filed January 10, 1917. Serial No. 141,669.

*To all whom it may concern:*

Be it known that I, GEORGE V. CURTIS, a citizen of the United States of America, residing at Springfield, in the county of Hampden and State of Massachusetts, have invented a new and useful Universal Joint, of which the following is a specification.

My invention relates to joints of the universal type such as are used as flexible connectors between obliquely disposed rotative members, or rotative members which are relatively subject to deflection or angular adjustment, such as shafts, and consists of two coupling-heads, stubs, or shaft-sections provided with adjacent bifurcated ends, a center block, a spindle having its ends inserted in the fork arms or prongs of one shaft-section and rotatable therein, said spindle passing through said block, a second spindle having its ends inserted in the fork arms or prongs of the other shaft-section and rotatable therein, said second spindle also passing through said block and said first-named spindle and a pin uniting said spindles and arranged to hold them in place and prevent independent relative movement thereof, all as hereinafter set forth.

One object of my invention is to produce a comparatively inexpensive universal joint, which is simple both in construction and operation, durable, well balanced, and withal practicable and efficient.

Another object is to provide for or in an universal joint a gyroscopic connector or coupling, the several elements of which are united or secured together so as to form a single stable unit, about or upon the working axes of which unit the connected coupling-head or shaft-section bifurcated parts oscillate or rock, and which axes in turn roll or partially rotate forward and backward in said parts. The operation or action of the connected members is stabilized by employing a coupling or center of fixedly united parts, and obtaining the necessary motion for the angular adjustment of the rotative members, as distinguished from the rotary motion of said last-named members, and the necessary rolling motion in either direction, at and by the ends of said parts which serve as axles.

This universal joint can be assembled easily and conveniently, which is a very desirable factor in a device of this kind.

Other objects and advantages will appear in the course of the following description.

I attain the objects and secure the advantages of my invention by the means illustrated in the accompanying drawings, in which—

Figure 1:
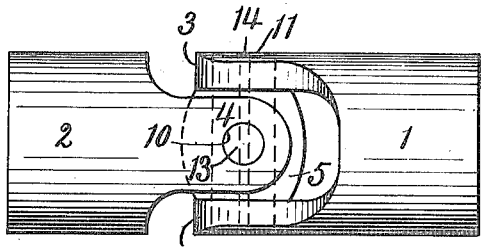
Figure 2:
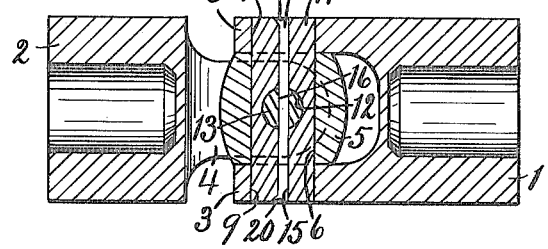
Figure 3:
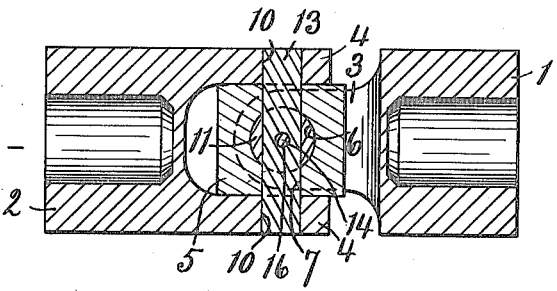

Figure 1 is a side elevation of an universal joint which embodies a practical form of my invention; Fig. 2, a central longitudinal section through said joint, taken on a vertical plane relative to Fig. 1; Fig. 3, a similar section taken on a horizotnal plane relative to the first view, and, Fig. 4, a sectional view generally similar to Fig. 2, but illustrating a modification.

Similar reference characters designate similar parts throughout the several views.

I have shown in each of the accompanying views two coupling-heads having the usual adjacent bifurcated ends, and although such coupling-heads are alike and both pairs of fork arms, or prongs are alike, I will use different designating numerals for the two coupling heads and other different designating numerals for the two pairs of prongs, in order to make it easier to understand clearly the description of the other parts and members of the joint. One of said coupling-heads is therefore designated by the numeral 1 and the other by the numeral 2, while the prongs of the first are designated by the numeral 3 and those of the second by the numeral 4.

It should be noted in passing that the term "coupling-head" as employed herein is intended to include stubs, shaft sections, or any other similar elements, which have adjacent end bifurcations for universal-joint purposes.

Figure 4:
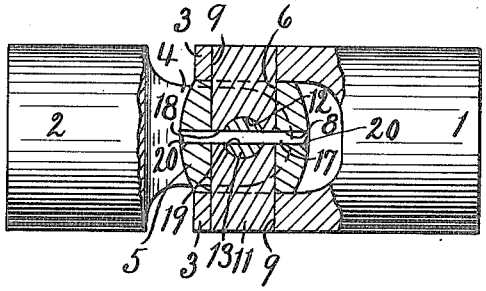

A center block 5 is provided to fit between the prongs in the two pairs (3 and 4), and is bored through in two directions, as at 6 and 7, and in a third direction, as at 8 in the Fig. 4 construction. The block 5 is faced off on four sides, one pair of such sides being diametrically opposite to the other pair, and the prongs 3 and 4 are faced off on the inside, as usual, so that said block and said prongs have a mutual sliding or operating fit. The bore 6 is larger than the bore 7, and said bores are central to the block 5, meeting in the center thereof, and are at right-angles to each other. The prongs 3 are bored midway between their lateral edges, at 9—9, and the bore 6 is in line with such openings, and the prongs 4 are bored midway between their lateral edges, at 10—10, and the bore 7 is in line with these openings, when said block is in position.

The openings 9 might just as well be in the prongs 4 and the openings 10 in the prongs 3, the position of the block 5 then being changed so that the larger bore would aline with the larger openings and the smaller bore with the smaller openings, the bore 8 not now being considered.

A spindle 11 is inserted in the bore 6, extends through such bore and projects beyond the sides of the block 5 through which such bore opens, and has such projecting terminals journaled in the openings 9 in the prongs 3. This spindle has a central transverse opening 12 through the same.

A spindle 13, of smaller diameter than the spindle 11, is inserted in the bore 7 and the opening 12, extends through such bore and projects beyond the sides of the block 5 through which such bore opens, and has such projecting terminals journaled in the openings 10 in the prongs 4.

For the purpose of fastening the spindles 11 and 13 together so that neither can rotate independently of the other or rotate at all in the block 5, I pin said spindles one to the other. In the construction shown in the first three views, a lock pin 14 is introduced into a passage 15 which extends through the longitudinal center of the spindle 11, and passes through a central transverse opening 16 in the spindle 13; while in the construction shown in the last view, a lock pin 17 is introduced into the bore 8 in the block, and passed through central transverse openings 18 and 19 in the respective spindles. In the first case the pin 14 secures the spindles 11 and 13 together, and in the second case the pin 17 secures the block 5 and said spindles together.

It is now clear that the spindles 11 and 13 and their bearings are freely movable relatively, but that said spindles are held securely against independent relative movement or rotative movement in the block 5 by means of either the pin 14 or the pin 17, and also by the same means they are directly or indirectly both held against endwise movement. The freedom of motion or movement existing between the spindle terminals and their bearings enables the coupling-heads to be revolved while disposed at any angle within the range of this joint, as is plainly to be seen.

In order to prevent either the pin 14 or the pin 17 from becoming loose and getting out of place, such pin may be secured with a drop of solder at each end, or it may be "staked" at each end, in the usual and well-known manner, as represented at 20, in Figs. 2 and 4.

The manner of assembling the parts to make up my universal joint will be readily understood from the foregoing description and upon reference to the drawings. The block 5 is first placed in position between the plane surfaces of the prongs 3 and 4, with the bores 6 and 7 in alinement with the openings or bearing sockets 9 and 10 in said prongs, respectively, next the spindle 11 is introduced into its bore and bearing sockets, then the spindle 13 is introduced into its bore and bearing sockets, passing through the opening 13 in said first-named spindle, and finally the lock pin 14 (or 17) is inserted and staked or otherwise secured.

The bore 6 is continuous, but the bore 7 is in two parts which open interiorly into the center, transversely, of the said bore 6. The passage 16 is also in two parts, likewise the passage 8, the former opening interiorly into the center, transversely, of the bore 12, and the latter opening interiorly into the center, transversely, of the bore 9, and exteriorly through the sides of the block 5 which are out of contact with either the prongs 3 or the prongs 4. There are necessarily two openings 18 in the spindle 11, and such openings extend from the outside of said spindle to the transverse opening 12 therein, at right-angles thereto.

Certain modifications in the shape, size, and arrangement of some or all of the parts of my universal joint may be made without departing from the spirit of my invention.

What I claim as my invention, and desire to secure by Letters Patent, is—

A universal joint comprising bifurcated coupling-heads having bearing-socket members, a block within the space between said members, a spindle passing through said block into the bearing sockets of one coupling-head, a second spindle passing through said block and said first-named spindle, at right-angles thereto, into the bearing sockets of the other coupling-head, and a lock pin passing through both of said spindles to secure them to said block and prevent either from moving independently of the other, and having means at both ends to engage contiguous parts of the pin-engaging members and retain said pin in place.

GEORGE V. CURTIS.

Witnesses:
F. A. CUTTER,
A. C. FAIRBANKS.